United States Patent
Cart

[19]

[11] Patent Number: 6,089,640
[45] Date of Patent: Jul. 18, 2000

[54] SUPPORT MECHANISM FOR A DOOR OF A MOTOR VEHICLE

[75] Inventor: Danny J. Cart, Long Beach, Calif.

[73] Assignee: Chrysler Corporation, Auburn Hills, Mich.

[21] Appl. No.: 08/915,225

[22] Filed: Aug. 20, 1997

Related U.S. Application Data

[60] Provisional application No. 60/035,758, Jan. 6, 1997.

[51] Int. Cl.$^7$ ...................................................... B60J 5/10
[52] U.S. Cl. .................... 296/56; 296/146.8; 296/146.11
[58] Field of Search ................................... 296/146.1, 56, 296/76, 146.8, 146.11, 146.12, 106

[56] References Cited

U.S. PATENT DOCUMENTS

| | | | |
|---|---|---|---|
| 2,916,176 | 12/1959 | Widmer | 296/106 X |
| 3,851,867 | 12/1974 | Fricko | 296/56 |
| 3,891,111 | 6/1975 | Snazuk | 217/60 |
| 4,118,131 | 10/1978 | Schnitzius | 296/56 X |
| 4,289,345 | 9/1981 | Tamamushi et al. | 296/106 X |
| 4,512,600 | 4/1985 | King | 296/56 X |
| 4,688,844 | 8/1987 | Hirose et al. | 296/106 X |
| 4,779,845 | 10/1988 | Bartesch et al. | 296/76 |
| 4,880,267 | 11/1989 | Ohya | 296/146.8 X |
| 4,925,230 | 5/1990 | Shelton | 269/106 X |
| 5,261,720 | 11/1993 | Lomax, Jr. et al. | 296/146.1 X |

OTHER PUBLICATIONS

1993 Chrysler Town & Country Minivan (photograph) (No Date).

*Primary Examiner*—D. Glenn Dayoan
*Attorney, Agent, or Firm*—Mark P. Calcaterra

[57] ABSTRACT

A support mechanism for supporting a door of a motor vehicle relative to a body portion of the motor vehicle as the door is rotated between an open position and a closed position about a horizontal axis includes an adjustable pneumatic strut. In a preferred form, the support mechanism includes a pair of substantially identical adjustable pneumatic struts. Each of the adjustable pneumatic struts includes a main body portion and a first end interconnected to the door of the vehicle. A second end of each of the adjustable pneumatic struts is interconnected to the body of the vehicle. In a preferred form, a first ball joint interconnects the first end to the rear hatch and a second ball joint interconnects the second end to the body.

6 Claims, 3 Drawing Sheets

6,089,640

SUPPORT MECHANISM FOR A DOOR OF A MOTOR VEHICLE

CROSS-REFERENCE TO RELATED APPLICATION

This application is a conventional application based on a provisional application filed Jan. 6, 1997 and assigned U.S. Ser. No. 60/035,758.

BACKGROUND OF THE INVENTION

1. Field of the Invention

The present invention generally relates to motor vehicles. More particularly, the present invention relates to a support mechanism for supporting a door of a motor vehicle as it is rotated about a horizontal axis between an open position and a lowered position.

2. Discussion

In recent years, a significant increase in consumer popularity for both sport utility vehicles and minivans has been experienced in the marketplace. The popularity of such vehicles is largely attributable to their inherent flexibility to comfortably transport an increased number of passengers and to also increase vehicle load carrying capacity. To effectively meet both of these potentially conflicting capabilities, minivans and sport utility vehicles, as well as similar vehicles, typically incorporate a forward occupant area and rearward load carrying area. Direct access to the rearward load carrying area is often provided in such vehicles through a rear hatch. In a conventional manner, a rear hatch is pivotally mounted at the rear of the vehicle body for rotation about a horizontal axis adjacent to the roof of the vehicle. Access into the load carrying area is gained by upwardly rotating the rear hatch from a closed position to an open position.

To assist with manual operation, it is known to provide a mechanism for supporting a rear hatch of a motor vehicle when it is rotated from its closed position. For example, motor vehicles having a rear hatch are generally equipped with a support mechanism in a form which includes a pair of adjustable pneumatic struts. The struts are disposed on laterally opposing sides of the vehicle and adjustably interconnect the rear hatch with adjacent portions of the vehicle body. The ends of the pneumatic struts are mounted for simple rotation about a pivot axis. As the rear hatch is raised from its closed position, the pneumatic struts rotate through a planar path and an adjustable arm of the pneumatic struts extends. The pneumatic struts are pressurized to oppose the weight of the rear hatch, thereby facilitating opening and closing.

While known constructions of support mechanisms for vehicle doors mounted for rotation about a horizontal axis, including the specific type discussed above, have generally proven to be commercially acceptable for permitting access to vehicle load carrying areas, all nevertheless are associated with inherent disadvantages. Most significantly insofar as the present invention is concerned, the pneumatic struts of known support mechanisms visually detract from the vehicle styling and partially prevent free access to the rear storage area. In this regard, in known arrangements the pneumatic struts for supporting the vehicle door are mounted to the C-pillars of the vehicle at points significantly displaced from the roof line of the vehicle. As a result, when the vehicle door is rotated to its open position, the pneumatic struts extend upwardly and rearwardly from the vehicle at an angle to engage the door. In this position, the appearance of the pneumatic struts is undesirable and free axis to the rear storage area from the side of the vehicle is prevented.

Thus, a need exists for a support mechanism for a vehicle door mounted for rotation about a horizontal axis which overcomes the disadvantages associated with conventional arrangements.

SUMMARY OF THE INVENTION

It is a principal object of the present invention to provide a support mechanism for a door of a motor vehicle mounted for rotation about a horizontal axis which does not interfere with free access to the vehicle interior when the rear hatch is oriented to an open position.

It is a related object of the present invention to provide a support mechanism for a door of a motor vehicle mounted for rotation about a horizontal axis of simple and compact construction.

It is a more particular object of the present invention to provide a support mechanism for a rear hatch of a motor vehicle including a pair of adjustable pneumatic struts each having a body which is permitted to rotate through an arcuate path as the rear hatch is rotated between its open position and its closed position.

By satisfying the above and other objects, the present invention comprises an improvement over prior known support mechanisms for horizontally mounted motor vehicle doors.

In one form, the present invention provides a support mechanism for supporting a door of a motor vehicle as the door is rotated between an open position and a closed position about a horizontal axis relative to a body portion of the vehicle. The support mechanism includes an adjustable pneumatic strut. The adjustable pneumatic strut has a body, a first end, and a second end. The first end is interconnected to the door of the vehicle. A second end of the adjustable pneumatic strut is connected to the body portion of the vehicle. The support mechanism further includes means for permitting the pneumatic strut to follow an arcuate path as the door is rotated between the open position and the closed position.

In another form, the present invention provides a support mechanism for supporting a door of motor vehicle relative to a body portion of the motor vehicle as the door is rotated about a horizontal axis. The support mechanism includes a support member having a main body portion. A first end of the support member is interconnected to the door of the vehicle. A second end of the support member is interconnected to the body portion of the vehicle. The support member further includes an extendable arm which is telescopically received by the main body portion. The extendable arm is operable to extend and contract as the door is rotated about the horizontal axis such that the extendable arm extends as the door is rotated from a fully open position to an intermediate position and contracts as the door is rotated from the intermediate position to a closed position.

In a more preferred form, the present invention provides a support mechanism for supporting a door of a motor vehicle relative to a body portion of a motor vehicle as the door is rotated between the open position and the closed position about a horizontal axis. The support mechanism includes a telescopic member having a first end and a second end. A first ball joint interconnects the first end of the telescopic member and the door. A second end of the ball joint interconnects the second end of the telescopic member and the body portion of the vehicle. The first and second ball joints permit the telescopic member to follow a generally arcuate path as the door is rotated between the open position and the closed position.

BRIEF DESCRIPTION OF THE DRAWINGS

Additional objects and advantages of the present invention will become apparent from a reading of the following detailed description of the preferred embodiment which makes reference to the drawings of which.

DETAILED DESCRIPTION OF THE PREFERRED EMBODIMENT

Figure 1:
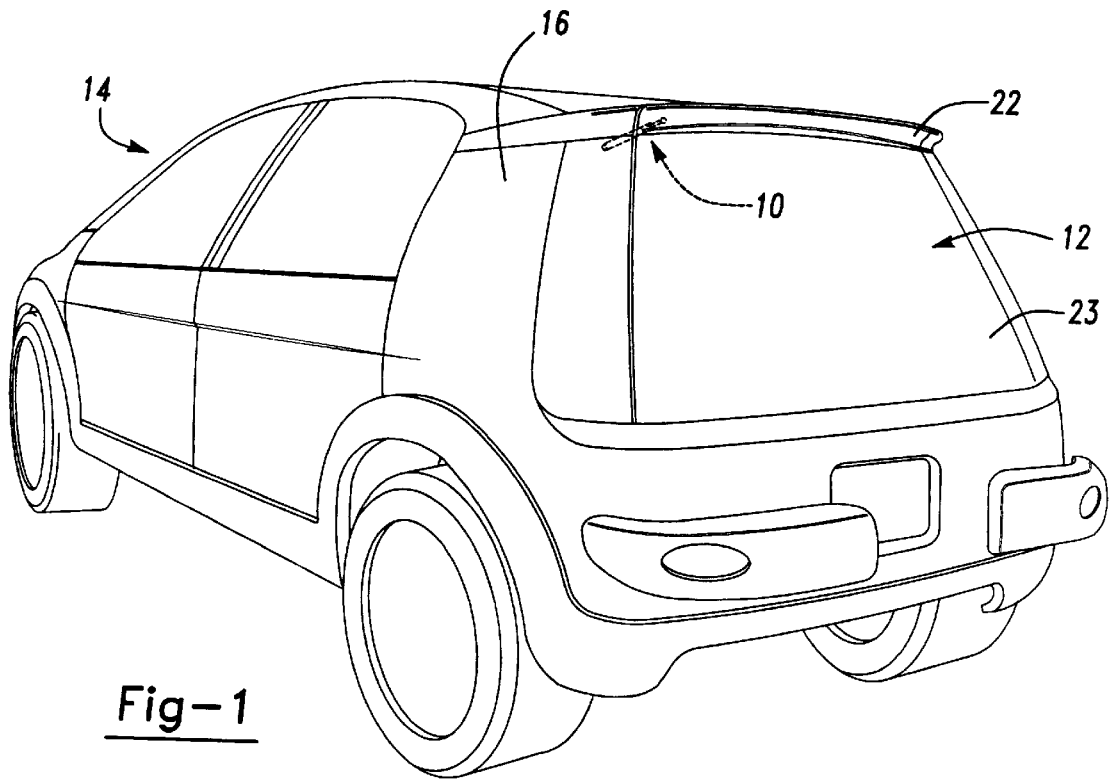
FIG. 1 is a rear and side perspective view of an exemplary vehicle including a door support mechanism constructed according with a preferred embodiment of the present invention shown.

Referring generally to the drawings, in which like reference numerals have been used to identify like elements throughout, a support mechanism for a door of a motor vehicle constructed in accordance with a preferred embodiment of the present invention is shown and generally identified with reference numeral 10. In the embodiment illustrated, the support mechanism 10 is operative for supporting a rear hatch 12 of a motor vehicle 14 which is mounted to the body 16 of the vehicle for rotation about a horizontal axis.

Figure 2:
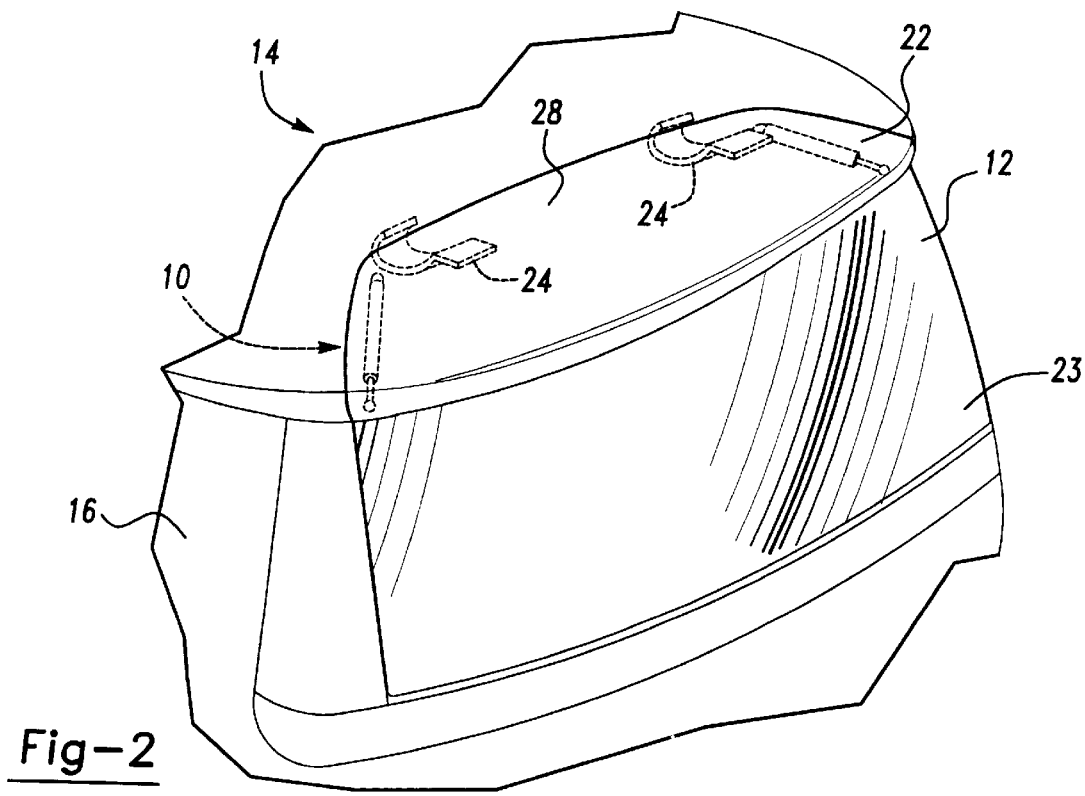
FIG. 2 is an enlarged rear and side perspective view of the exemplary vehicle of FIG. 1 illustrating the support mechanism in broken lines and shown with the rear hatch of the vehicle in a closed position.
Figure 3:
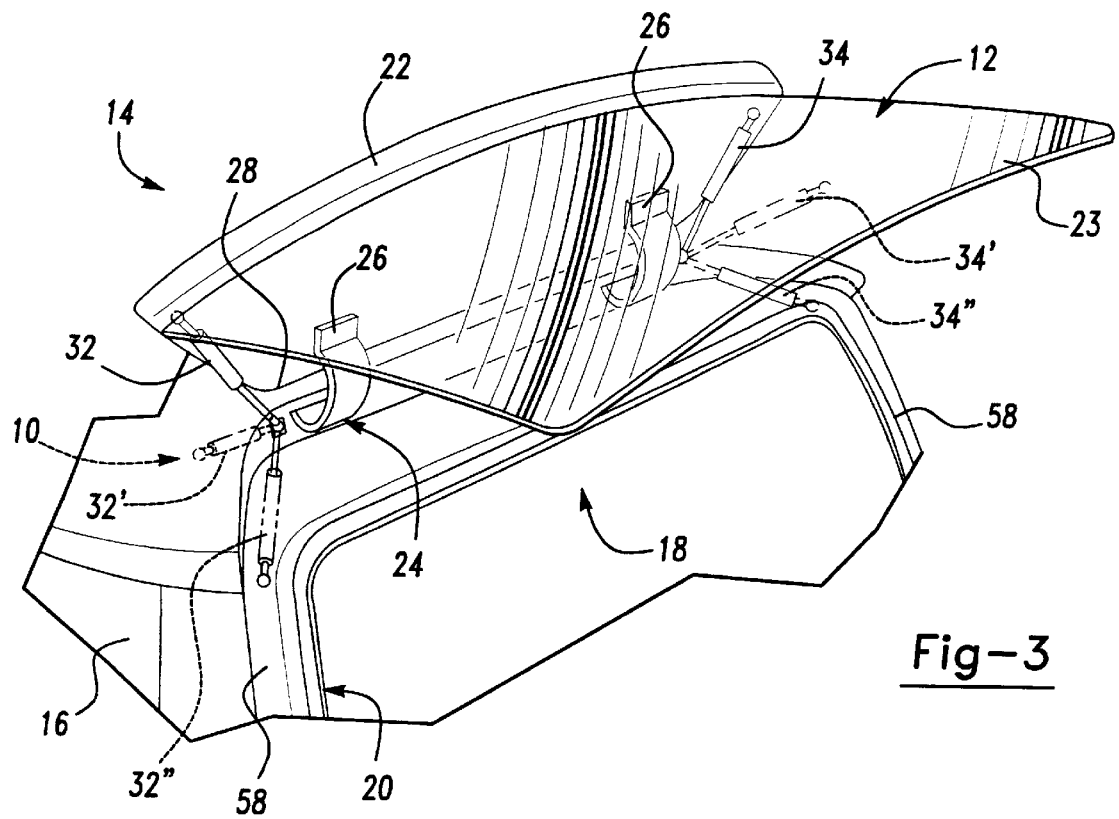
FIG. 3 is an enlarged rear and side perspective view similar to FIG. 2, illustrating the rear hatch of the vehicle rotated to an open position.
Figure 4:
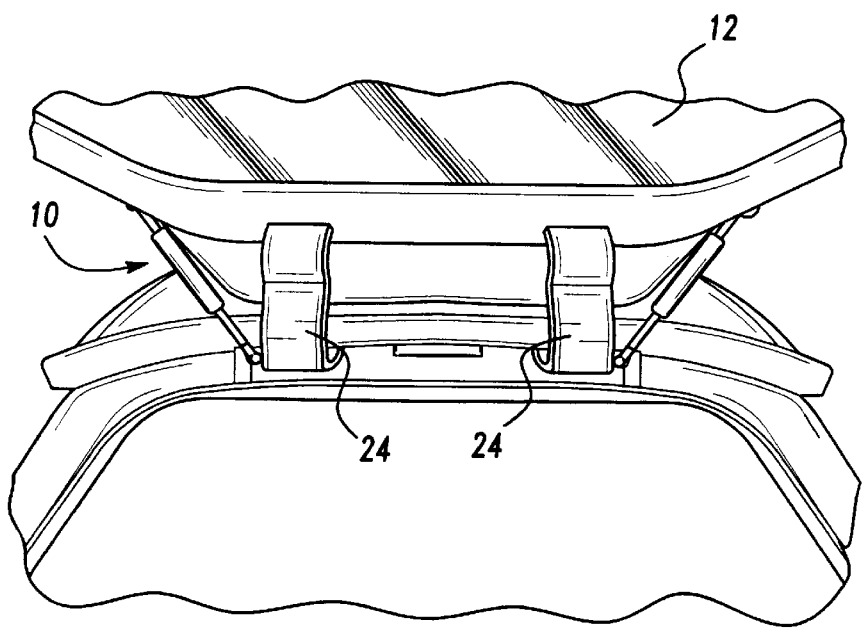
FIG. 4 is an enlarged direct rear view of a portion of the vehicle of FIG. 1 illustrated with the rear hatch in its fully open position.

The rear hatch 12 is illustrated in FIGS. 1 through 4 operatively connected with the vehicle 14 in various positions of use. More particularly, FIGS. 1 and 2 illustrates the rear hatch 12 in a closed position wherein a rearwardly located storage area 18 of the vehicle 14 is inaccessible and protected from unwanted intrusion. FIG. 3 illustrates the rear hatch 12 in an open position. As shown, the vehicle 14 includes a main body 16 defining a rear opening 20 corresponding generally in size with the rear hatch 12.

The rear hatch 12 generally includes an upper mounting portion 22 and a lower glass panel 23 attached thereto. In the embodiment illustrated, the mounting portion 22 and the glass panel 23 both taper slightly as they extend upwardly. However, it will be appreciated by those skilled in the art that the rear hatch 12 illustrated, as well as the remainder of the vehicles with which the support mechanism 10 is operatively associated, is merely exemplary. In this regard, the support mechanism 10 is applicable for use with any type of vehicle having a door or other panel which is rotatable about a horizontal axis.

The vehicle 14 is shown to further includes means for articulating the rear hatch 12 about a horizontal axis between the closed position and the open position. In the exemplary embodiment, the means for articulating the rear hatch 12 is provided by a pair of hinges 24. Both hinges 24 of the pair of hinges include a first end 26 attached to the rear hatch 12 adjacent an upper edge 28 thereof. (A second end 30) of the hinges 24 is attached to the vehicle body 16. Attachment of the ends 26 and 30 of the hinges 24 to the rear hatch 12 and body 16 may be accomplished with fasteners, adhesive, or any other manner well known in the art. The hinges 24 provide for pivotal movement of the rear hatch 12 relative to the body 16 of the vehicle 14 about a horizontal axis disposed substantially adjacent the upper edge 28 of the rear hatch 12.

The support mechanism 10 of the present invention is shown to include a first telescopic member 32 which interconnects the body 16 of the vehicle 14 and the rear hatch 12 and operates to support the rear hatch 12 as it is rotated from its closed position. In the preferred embodiment, the support mechanism 10 is further shown to include a second telescopic member 34 which is substantially identical in function and operation to the first telescopic member. Thus, it will be understood by those skilled in the art that the construction and operation of the second telescopic member 34 may be understood from the description of the first telescopic member 32 which follows.

Figure 5:
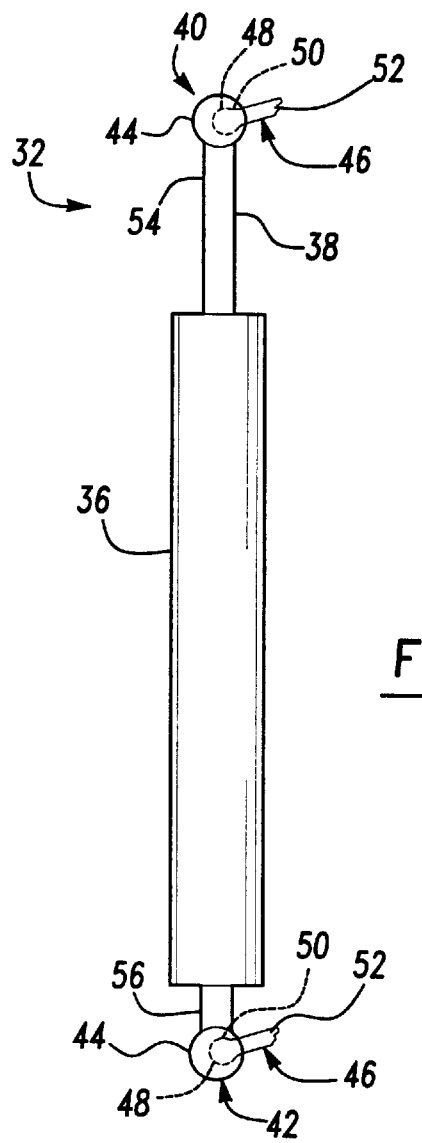
FIG. 5 is an enlarged side view of the first adjustable pneumatic strut of the door support mechanism of the present invention and the first and second ball joints which engage the rear hatch and vehicle body, respectively.

With continued reference to FIGS. 1 through 4 and additional reference to the enlarged side view of FIG. 5, the first telescopic member is shown to preferably comprise an adjustable pneumatic strut 32. The adjustable pneumatic strut 32 includes a main body portion 36 and an extendable arm 38 which is telescopically received by the main body portion in a conventional manner.

The main body portion of the first adjustable pneumatic strut 32 and the second adjustable pneumatic strut 34 are calibrated so as to effectively oppose a substantial portion of the weight of the rear hatch 12 as the rear hatch 12 is rotated between its open position and its closed position. As a result, the rear hatch 12 can be opened and closed through the application of minimal force. In one application, the body 36 of the first pneumatic strut 32 is approximately four inches in length and the maximum extension of the extendable arm 38 is approximately two inches. The particular size and calibration of the pneumatic struts 32 and 34 is largely dependent on the weight of the rear hatch 12 and may be modified accordingly for other applications.

Figure 6:
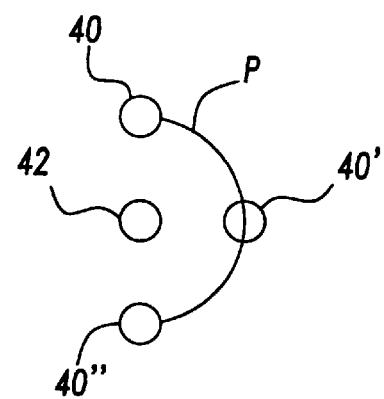
FIG. 6 is a schematic representation of the first ball joint of the first adjustable pneumatic strut relative to the second ball joint as the rear hatch is rotated from its fully open position to its closed position.

With additional reference to the schematic view of FIG. 6, the support mechanism 10 of the present invention will be understood to further include means for permitting the main body portions 36 of the first and second pneumatic struts 32 and 34 to follow a generally arcuate path as the rear hatch 12 is rotated between the open position and the closed position. In the preferred embodiment, the means for permitting the main body portion 36 to follow a generally arcuate path P is provided in the form of a first ball joint 40 and a second ball joint 42. The first ball joint 40 interconnects the first pneumatic strut 32 with the rear hatch 12. The second ball joint 42 interconnects the first pneumatic strut 32 with the body 16 of the vehicle 14.

As shown most clearly in FIG. 5, the first and second ball joints 40 and 42 each include a male component 44 and a female component 46. The female component 46 is generally spherical in shape and partially defines a spherical cavity 48 (shown in FIG. 5 in broken lines) for receiving a spherical head 50 of male component 44. The male component 46 also includes a shaft 52 which engages the spherical head 50 (shown in FIG. 5 in broken lines). The spherical head 50 is disposed within the spherical cavity 48 and permits substantially universal movement therebetween.

With respect to the first ball joint 40, the female component 44 is fixed to a distal end 54 of the adjustable arm 38. The shaft 52 of the male component 44 extends from the body 16 of the vehicle 14 adjacent an upper corner of the rear hatch 12. With respect to the second ball joint 42, the female component 44 is interconnected to the main body 36 through a mounting shaft 56. The shaft 52 of the male component 44 extends from the vehicle body 16 at a location downwardly spaced on the C-pillar 58 of the vehicle 14.

With specific reference to the side perspective view of FIG. 3 and the schematic view of FIG. 6, the operation of the support mechanism 10 of the present invention will be described. In FIGS. 3 and 6, the first and second adjustable pneumatic struts 30 and 32 and the first and second ball joints 40 and 42 are shown in solid lines when the rear hatch 12 is in its fully open position. The relative positions of the first and second adjustable pneumatic struts when the rear hatch 12 is in an intermediate position and a closed position are shown in broken lines. These elements are identified with primed reference numerals in the intermediate position and double primed reference numerals in the closed position.

With the rear hatch 12 in its open position, both of the first and second pneumatic struts 30 and 32 diverge outwardly relative to a longitudinal centerline of the vehicle 14 as it extends to engage the rear hatch 12. As the rear hatch 12 is rotated from its open position to its closed position, the axes defined by the pneumatic struts 30 and 32 follow a generally arcuate path. Similarly, the position of the first ball joint 40 relative to the second ball joint 42 follows a generally arcuate path P as the rear hatch 12 is rotated from its fully open position to the closed position, as schematically shown in FIG. 6.

When the rear hatch 12 is in its open position, the extendable arms 38 of the pneumatic struts 32 and 34 are fully extended. When the rear hatch 12 is in its intermediate position, the adjustable arm 38 of the pneumatic struts 32 and 34 are fully contracted. As the rear hatch 12 is manually urged from its intermediate position to its closed position, the adjustable arms 38 of the pneumatic struts 32 and 34 extend to their fully extended positions. By orientating the pneumatic struts 32 and 34 so that the extendable arms 38 are fully extended when the rear hatch 12 is fully opened or closed, and fully contracted when in their intermediate positions, the required stroke for the pneumatic struts 32 and 34 is effectively reduced by fifty percent (50%) from conventional arrangements. As a result, pneumatic struts 32 and 34 of significantly shorter length may be employed.

Having described the operation of the support mechanism 10 as the rear hatch is rotated from its open position to its closed position, it will be apparent that operation of the support mechanism 10 from the closed position to the open position is accomplished in a reverse manner.

While the above detailed description describes the preferred embodiment of the present invention, it will be understood that the present invention is susceptible to modification, variation and alteration without deviating from the scope and fair meaning of the subjoined claims. For example, the exemplary embodiment illustrated shows the extendable arm 38 of the first and second adjustable pneumatic struts 32 and 34 attached to the body 16 of the vehicle 14. Alternatively, the adjustable arm 38 of the pneumatic struts 30 and 32 may be directly attached to the rear hatch 12.

What is claimed is:

1. A strut assembly in combination with a motor vehicle, the strut assembly for supporting a door of the motor vehicle, the motor vehicle having a body portion, the door attached to the body for articulation between closed, open and intermediate positions, said strut assembly comprising:

a main body;

a telescopic arm telescopically received by a first end of said main body, said telescopic arm having a distal end including a first ball joint connected to the door or the body portion of the motor vehicle, said telescopic arm movable between a fully extended position and a fully contracted position such that said telescopic arm is in said fully extended position when the door is articulated to both its open and closed positions and said telescopic arm is in said fully contracted position when the door is articulated to its intermediate position; and a fixed arm fixedly attached to a second end of said main body, said fixed arm connected to the door or the body portion.

2. The strut assembly of claim 1, wherein said fixed arm includes a second ball joint connected to the door or the body portion.

3. The strut assembly of claim 1, wherein said first ball joint is connected to the body portion.

4. The strut assembly of claim 1, wherein the first ball joint is connected to one of a rear hatch of the motor vehicle and the body portion.

5. The strut assembly of claim 4, wherein the first ball joint is attached to a substantially vertically oriented upper portion of said rear hatch.

6. The strut assembly of claim 4, wherein said fixed arm is attached to said rear hatch at a point disposed below said first ball joint when said rear hatch is pivoted to a closed position.

* * * * *